United States Patent
Tsai et al.

(10) Patent No.: US 8,412,963 B2
(45) Date of Patent: Apr. 2, 2013

(54) POWER SUPPLYING AND DATA TRANSMITTING METHOD FOR INDUCTION TYPE POWER SUPPLY SYSTEM

(75) Inventors: Ming-Chiu Tsai, Chung-Ho (TW); Chi-Che Chan, Chung-Ho (TW)

(73) Assignee: Fu Da Tong Technology Co., Ltd., Chung-Ho, Taipei County (TW)

( * ) Notice: Subject to any disclaimer, the term of this patent is extended or adjusted under 35 U.S.C. 154(b) by 345 days.

(21) Appl. No.: 12/923,050

(22) Filed: Aug. 31, 2010

(65) Prior Publication Data

US 2011/0264945 A1 Oct. 27, 2011

(30) Foreign Application Priority Data

Apr. 26, 2010 (TW) .............................. 99113132 A

(51) Int. Cl.
*G06F 1/00* (2006.01)
*H02J 7/00* (2006.01)
*G06F 11/30* (2006.01)

(52) U.S. Cl. ........ 713/300; 713/340; 320/108; 307/104; 455/573

(58) Field of Classification Search .................. 713/300, 713/340; 320/108; 307/104; 455/573
See application file for complete search history.

(56) References Cited

U.S. PATENT DOCUMENTS

| | | | | |
|---|---|---|---|---|
| 8,098,043 | B2 * | 1/2012 | Lin ................................ | 320/108 |
| 8,159,183 | B2 * | 4/2012 | Choi et al. ..................... | 320/108 |
| 8,183,827 | B2 * | 5/2012 | Lyon ............................. | 320/108 |
| 8,188,619 | B2 * | 5/2012 | Azancot et al. ................ | 307/104 |
| 8,193,764 | B2 * | 6/2012 | Jakubowski .................. | 320/108 |
| 8,212,518 | B2 * | 7/2012 | Pijnenburg et al. ........... | 320/108 |
| 8,217,535 | B2 * | 7/2012 | Uchida et al. ................. | 307/104 |
| 8,217,621 | B2 * | 7/2012 | Tsai et al. ..................... | 320/108 |
| 8,248,024 | B2 * | 8/2012 | Yuan et al. .................... | 320/108 |
| 2011/0136550 | A1 * | 6/2011 | Maugars ....................... | 455/573 |
| 2011/0291489 | A1 * | 12/2011 | Tsai et al. ..................... | 307/104 |

\* cited by examiner

*Primary Examiner* — Brian Misiura
(74) *Attorney, Agent, or Firm* — Bacon & Thomas, PLLC

(57) ABSTRACT

A power supply and data signal transmission method used in an induction type power supply system consisting of a power supply module and a power-receiving module for transmission of electrical energy and data signal is disclosed. The microprocessor of the power supply module scans the resonant point of the power supply coil to send a segment of energy for recognition of a feedback signal from the power-receiving module and then starts providing power supply after receipt of the feedback signal, and then runs further signal modulation, transmission, data decoding and other follow-up steps, achieving transmission of electrical energy and data signal wirelessly.

8 Claims, 12 Drawing Sheets

POWER SUPPLYING AND DATA TRANSMITTING METHOD FOR INDUCTION TYPE POWER SUPPLY SYSTEM

This application claims the priority benefit of Taiwan Patent application number 099113132 filed on Apr. 26, 2010.

BACKGROUND OF THE INVENTION

1. Field of the Invention

The present invention relates to power supply systems and more particularly, to a power supplying and data transmitting method used in an induction type power supply system consisting of a power supply module and a power-receiving module for transmission of electrical energy and data signal.

2. Description of the Related Art

With the coming of digital era, many digitalized electronic products, such as digital camera, cellular telephone, music player (MP3, MP4) and etc., have been continuously developed and have appeared on the market. These modern digital electronic products commonly have light, thin, short and small characteristics. For high mobility, power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, it is not economic to purchase a respective battery charger when buying a new mobile electronic product.

Further, when using a battery charger to charge the rechargeable battery of a mobile electronic product, it is necessary to connect the connection interface of the battery charger to an electric outlet and then insert the power output plug of the battery charger to the power jack of the mobile electronic product. After charging, the user needs to remove the battery charger from the mobile electronic product. When wishing to charge the rechargeable battery of a mobile electronic product, the user must carry the mobile electronic product to a place where there is an electric outlet. When one goes out and there is no any electric outlet available, the user will be unable to charge the rechargeable battery of his (her) mobile electronic product.

Further, except of charging the battery, an electronic device may have to make certain function settings, to edit data, or to transmit data. Some electronic devices allow the use make setting and to edit and transmit data. However, some other electronic devices (such as, MP3, MP4, digital camera, electronic watch, portable game machine, wireless game grip, remote controller, and etc.) do not allow direct setting, data editing or data transmission. In this case, an external electronic device (computer, PDA) must be used to achieve setting, data editing or data transmission. Further, an electronic device cannot be operated to transmit data during battery charging.

Taiwan Patent Publication No. 201004086 discloses a power supply system, entitled "Induction type power supply system with battery scan function", filed on Feb. 20, 2009 under application serial number 98105373, and issued on Jan. 16, 2010. This invention teaches the use of a load resistor for a signal modulation in an induction type power supply system to feed back signal from the secondary coil to the primary coil. However, this method still has drawbacks as follows:

1. The resistor type modulator consumes much power during signal modulation. The dynamic range of the modulation is determined subject to the value of the resistance at the load. Because the signal analysis ability of the primary coil in the power supply system is reduced subject to increasing of the distance of the secondary coil, the modulation dynamic range must be enhanced for data analysis, i.e., the resistance value must be reduced to amplify load effect during modulation. However, this method has a limitation. When the resistance at the load is close to a short-circuit status, no further adjustment is allowed.

2. During modulation, the positive pole of the power supply at the power-receiving end approaches the ground terminal. At this time, a surge goes through the rectifier and the voltage stabilizer in the loop, causing a sudden rise of temperature that may damage circuit components.

3. Due to the limitation of electrical characteristics, the resistor load must be installed posterior to the rectifier with a filter capacitor bridged over the ends. This voltage stabilizing effect slows down signal modulation reaction speed. In consequence, a relatively higher carrier frequency is necessary for signal analysis.

4. The transmission of signal is a one-way transmission to transmit the feedback signal from the secondary coil to the primary coil, i.e., the method does not allow transmission of a signal from the primary coil to the secondary coil.

Therefore, it is desirable to a power supplying and data transmitting method for induction type power supply system that eliminates the aforesaid problems.

SUMMARY OF THE INVENTION

The present invention has been accomplished under the circumstances in view. It is one object of the present invention to provide a power supplying and data transmitting method, which is practical for transmission of electrical energy and data signal wirelessly.

To achieve this and other objects of the present invention, a power supplying and data transmitting method is used in an induction type power supply system consisting of a power supply module and a power-receiving module. The power supply module comprises a power supply microprocessor. The power supply microprocessor has electrically connected thereto a power supply driver unit, a power supply signal analysis unit, a voltage detector, a display unit, a power supply information management unit and a power circuit. The power supply driver unit comprises a half-/full-bridge driver electrically connected to the power supply microprocessor and two MOSFET arrays that are respectively connected to a resonant circuit. The resonant circuit has connected thereto a power supply coil that is adapted for transmitting electric energy and data signal. The power-receiving module comprises a power-receiving microprocessor that has electrically connected thereto a power-receiving unit, a signal processing unit, a power-receiving information management unit. The power-receiving unit comprises a voltage detection circuit, a charging management circuit, a current-detection protection system and a circuit breaker respectively connected to a voltage stabilizing circuit. The charging management circuit and the circuit breaker are respectively connected to a storage battery. The voltage detection circuit and the circuit breaker are respectively connected to a rectifier and filter circuit. The rectifier and filter circuit is connected to a resonant circuit. The resonant circuit is connected to a power-receiving coil, a carrier amplitude modulation circuit of a signal processing unit and a demodulation detection circuit of a power-receiving signal analysis circuit of the signal processing unit. Thus, power supply and data signal can be transmitted between the power supply module and the power-receiving module wirelessly.

DETAILED DESCRIPTION OF THE PREFERRED EMBODIMENT

Figure 1:
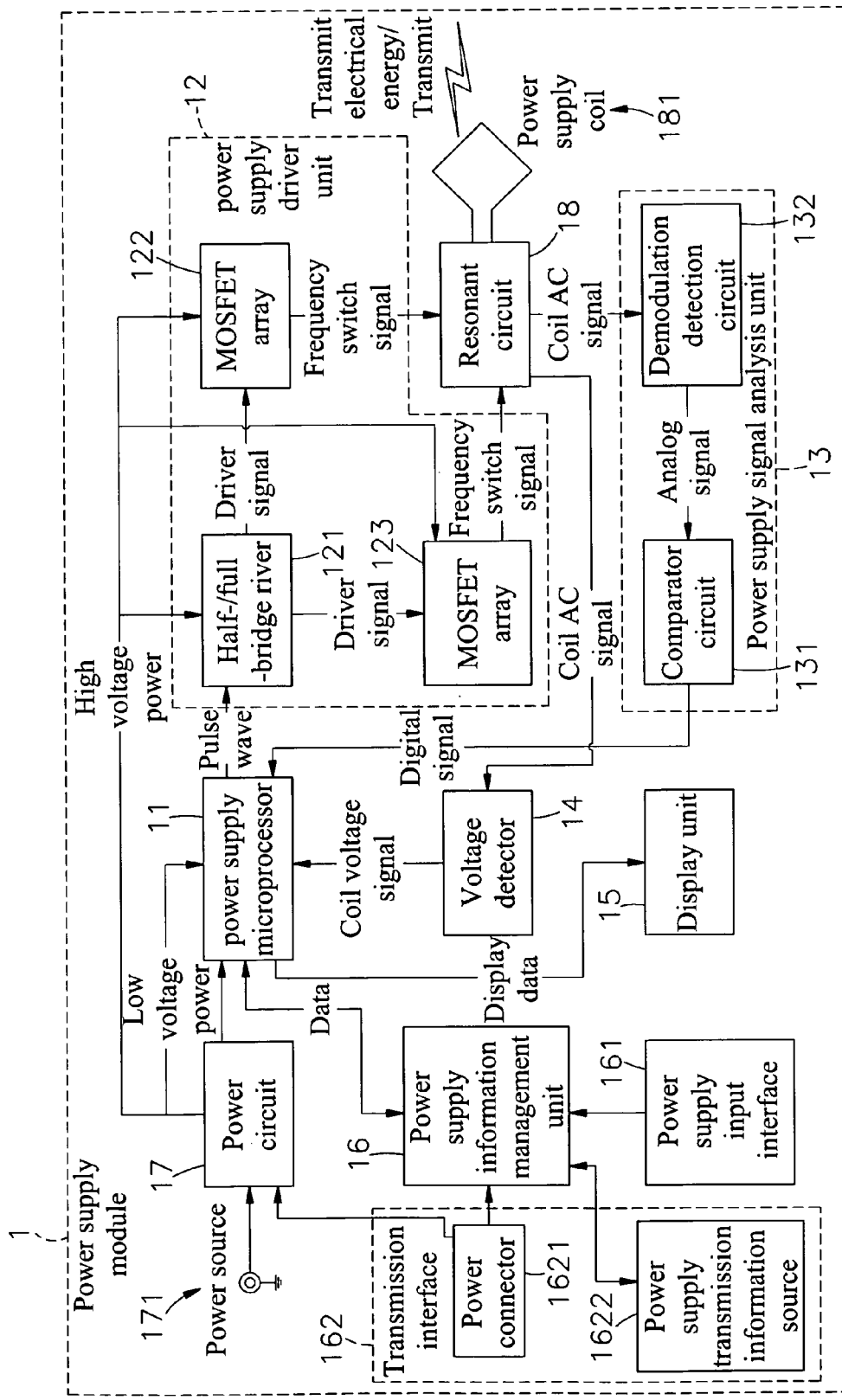
FIG. 1 is a circuit block diagram of a power supply module in accordance with the present invention.
Figure 2:
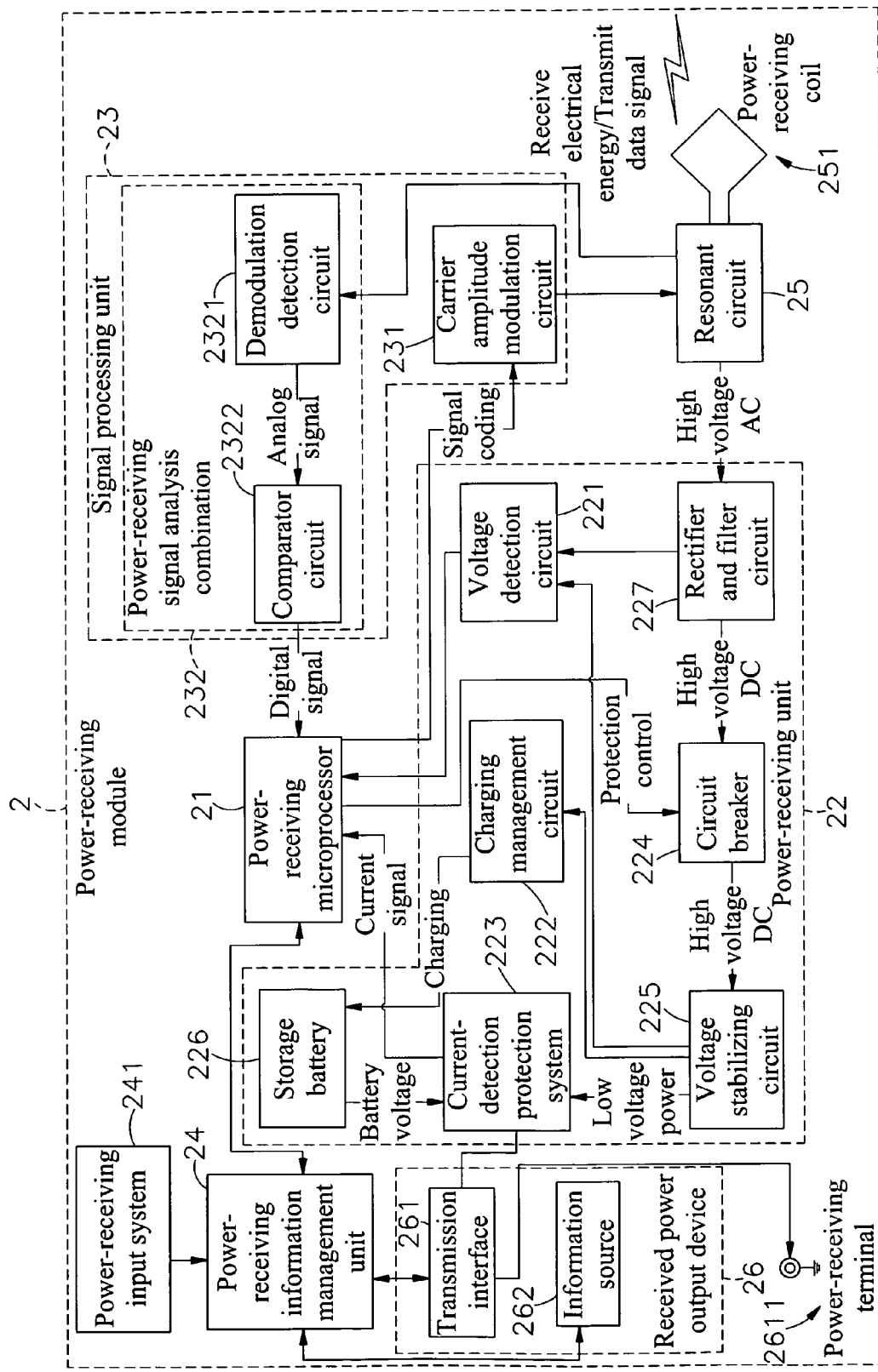
FIG. 2 is a circuit block diagram of a power-receiving module in accordance with the present invention.
Figure 3:
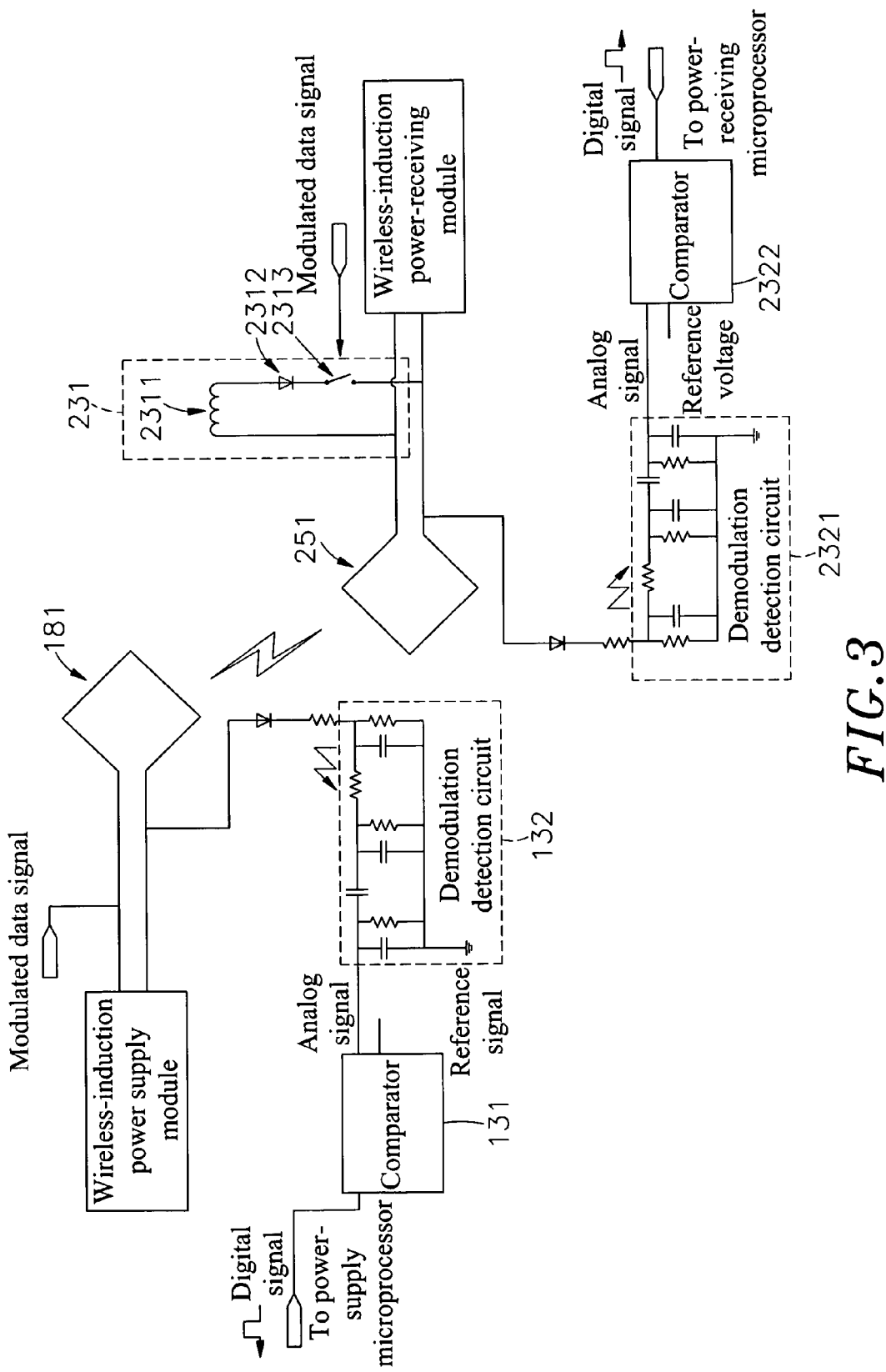
FIG. 3 is a simple circuit diagram of a part of the induction type power supply system in accordance with the present invention.
Figure 4:
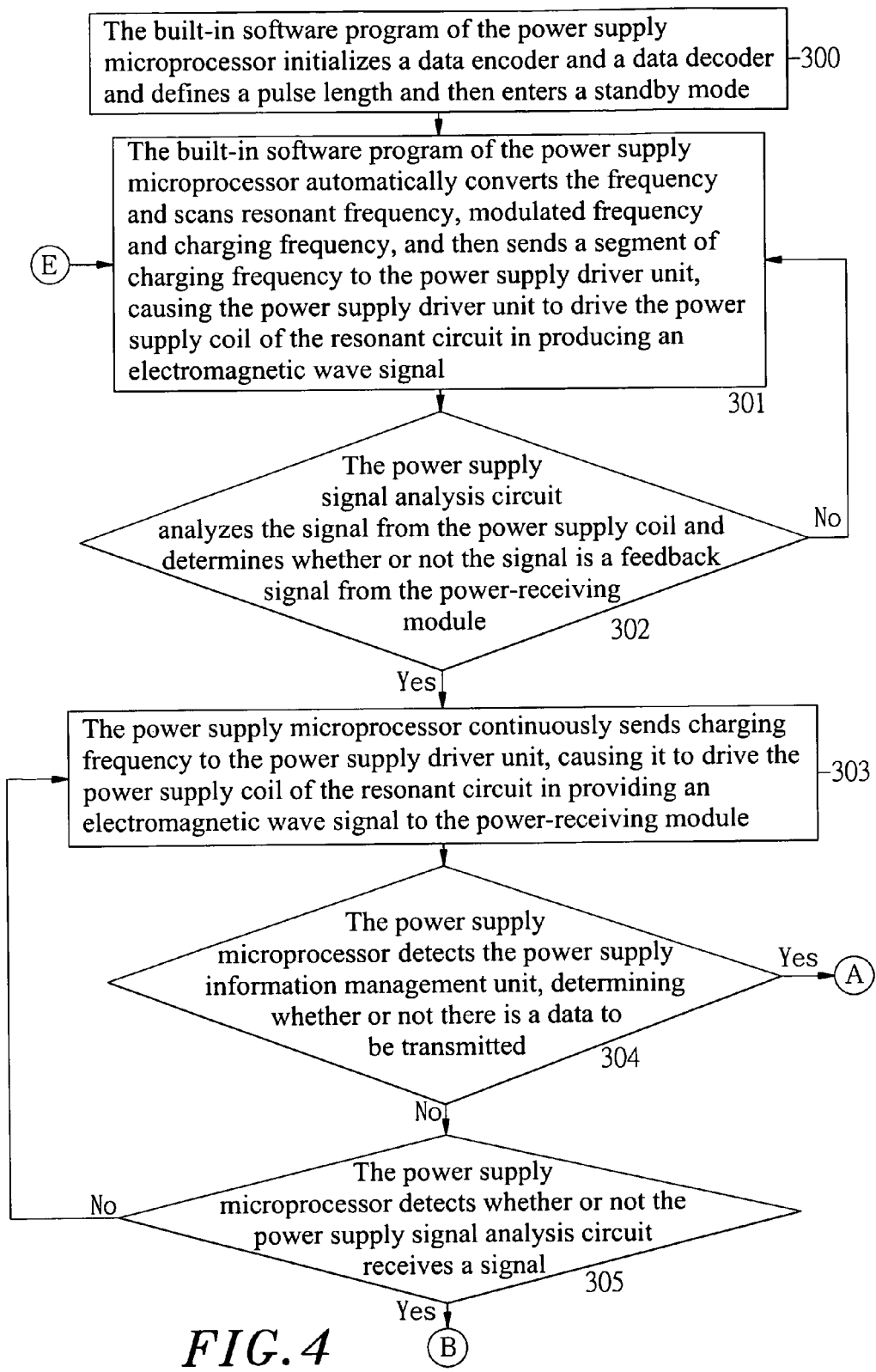
FIG. 4 is an operation flow chart of the present invention (I).
Figure 5:
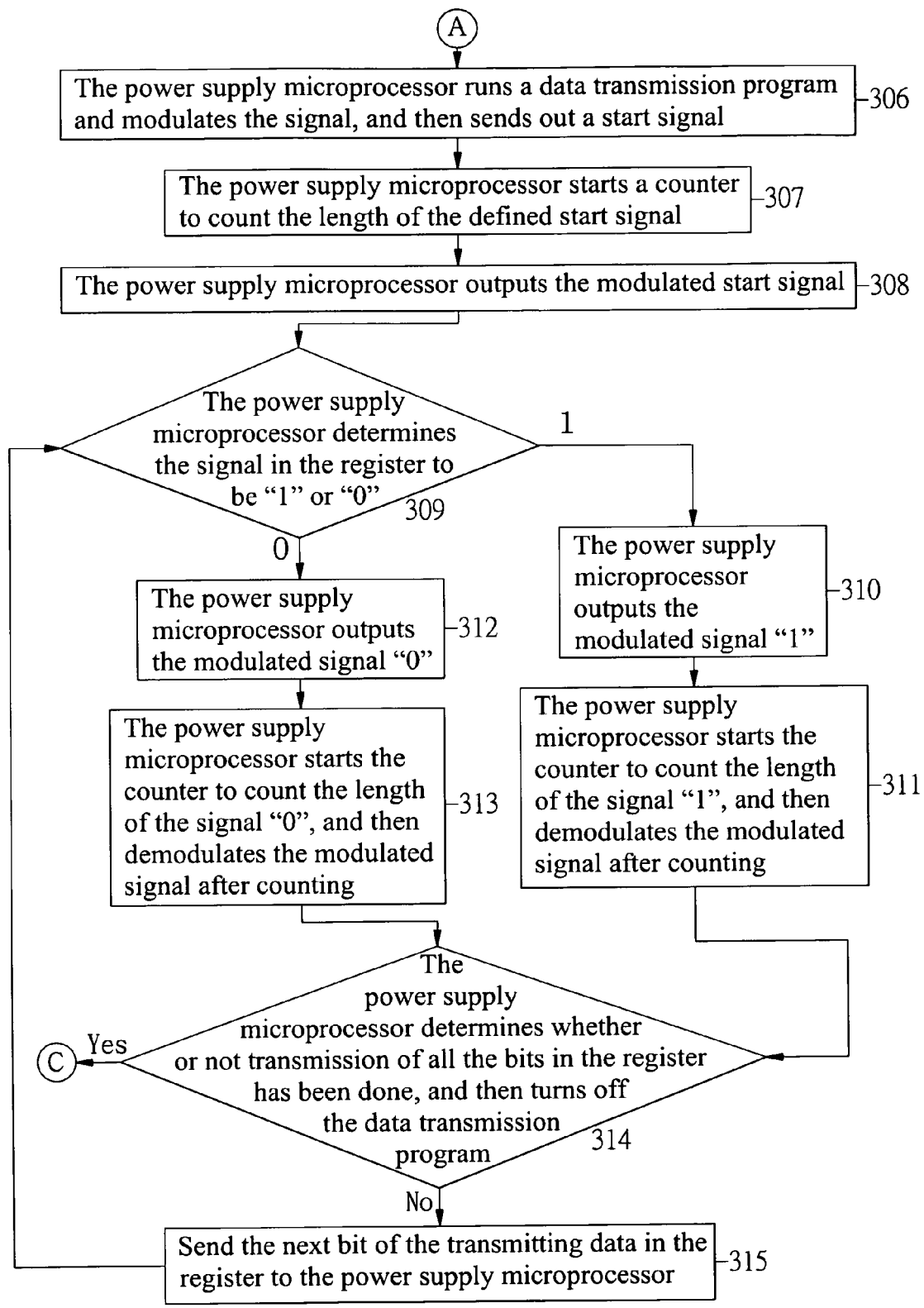
FIG. 5 is an operation flow chart of the present invention (II).
Figure 6:
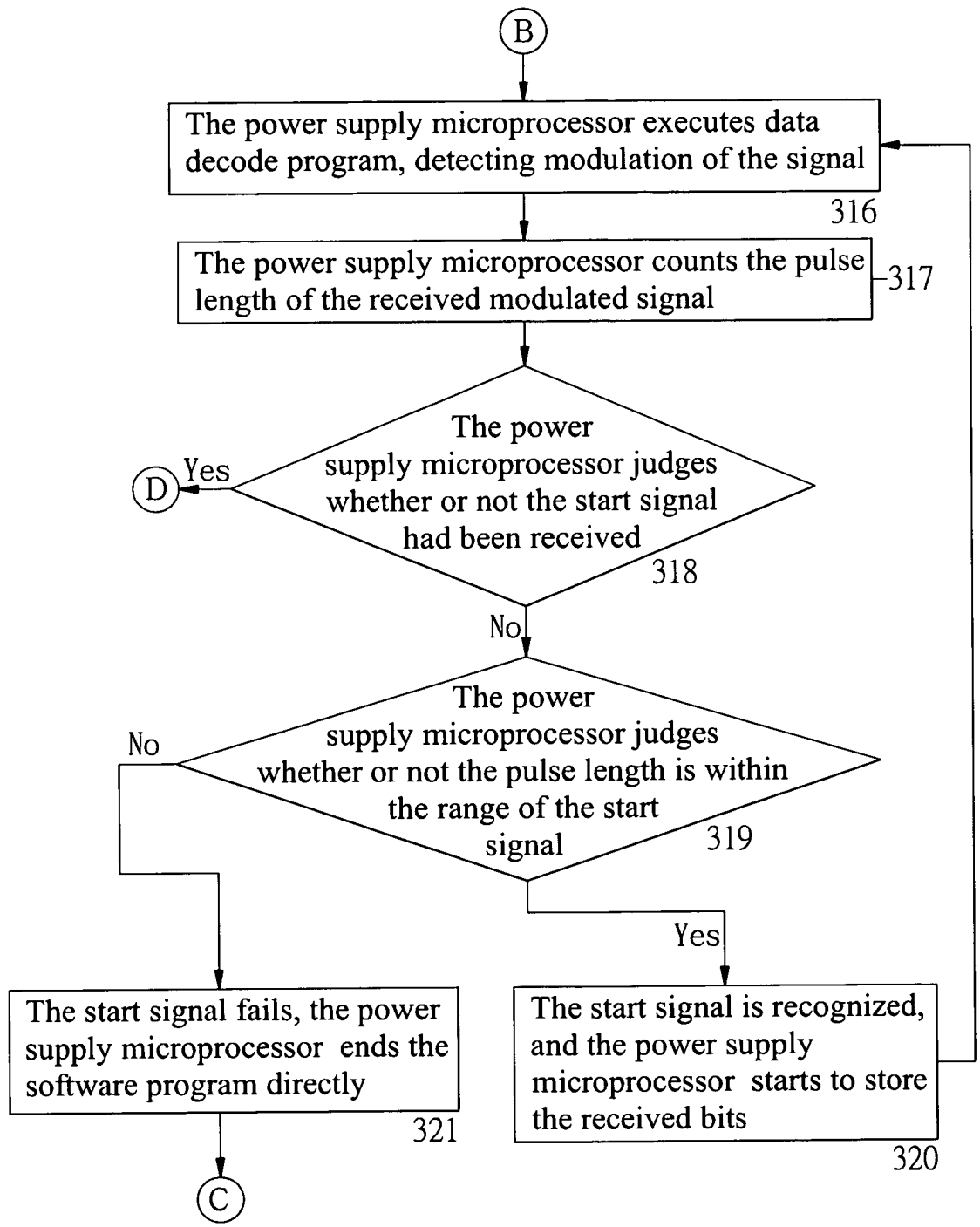
FIG. 6 is an operation flow chart of the present invention (III).
Figure 7:
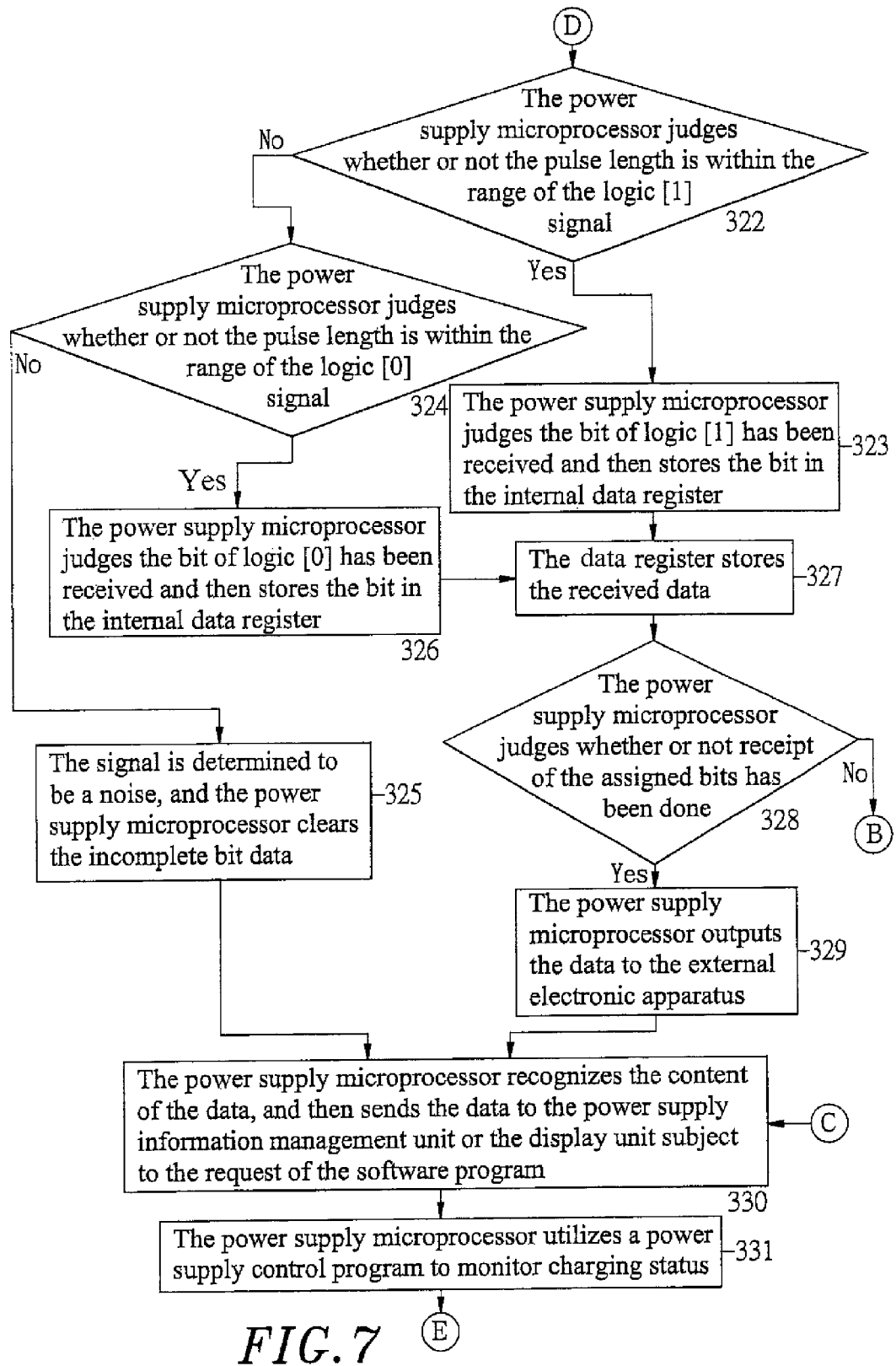
FIG. 7 is an operation flow chart of the present invention (IV).
Figure 8:
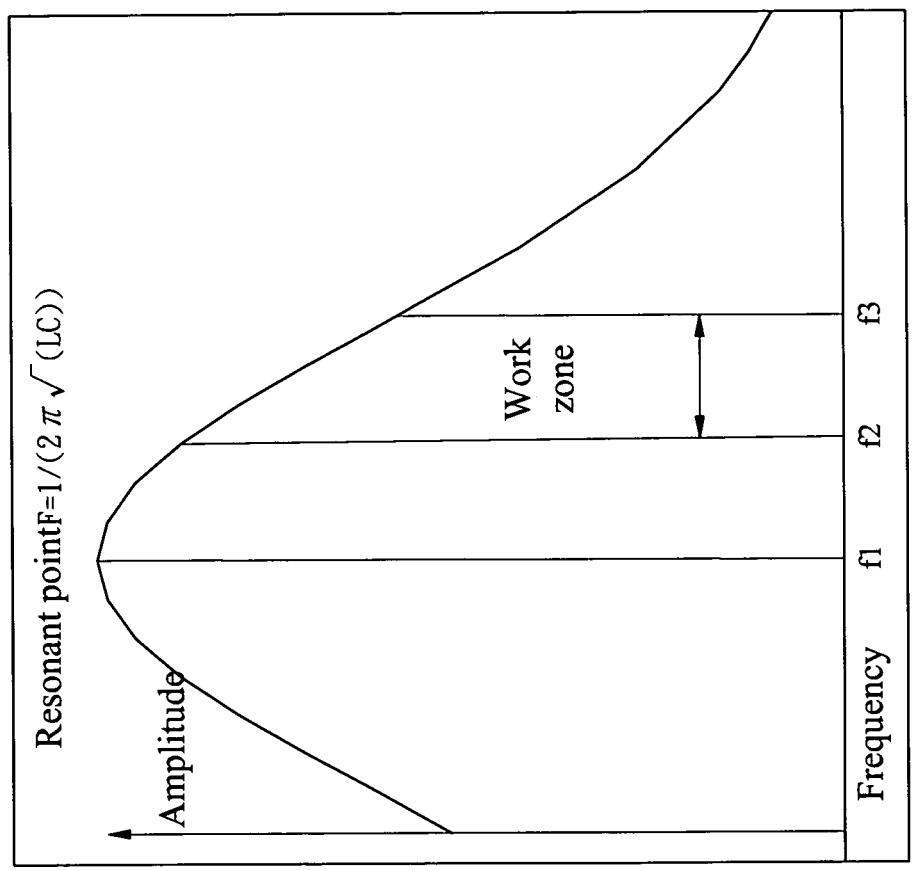
FIG. 8 is a schematic drawing showing signal frequency modulation according to the present invention.

Referring to FIGS. 1-7, an induction type power supply system is shown comprising a power supply module 1 and a power-receiving module 2.

The power supply module 1 comprises a power supply microprocessor 11 having installed therein an operation/control related software program. The power supply microprocessor 11 has electrically connected thereto a power supply driver unit 12, a power supply signal analysis unit 13, a voltage detector 14, a display unit 15, a power supply information management unit 16 and a power circuit 17. The power supply driver unit 12 comprises a half-/full-bridge driver 121 electrically connected to the power supply microprocessor 11 and two MOSFET arrays 122;123 that are respectively connected to a resonant circuit 18. The half-/full-bridge driver 121 of the power supply driver unit 12 and the two MOSFET arrays 122;123 are respectively connected to the power circuit 17. The power supply signal analysis circuit 13 is electrically connected to the power supply microprocessor 11 and a demodulation detection circuit 132 through a comparator circuit 131. Further, the demodulation detection circuit 132 is connected to the resonant circuit 18. The power supply information management unit 16 has connected thereto a power supply input interface 161 and a transmission interface 162. The transmission interface 162 is connected to a power connector 1621 and a power supply transmission information source 1622. The power supply input interface 161 is connected to the power circuit 17 that is connected to a power source 171. Further, the resonant circuit 18 has connected thereto a power supply coil 181 that is adapted for transmitting electric energy and data signal.

The power-receiving module 2 comprises a power-receiving microprocessor 21 having installed therein an operation/control related software program. The power-receiving microprocessor 21 has electrically connected thereto a power-receiving unit 22, a signal processing unit 23 and a power-receiving information management unit 24. The power-receiving unit 22 comprises a voltage detection circuit 221, a charging management circuit 222, a current-detection protection system 223 and a circuit breaker 224 respectively connected to a voltage stabilizing circuit 225. The charging management circuit 222 and the circuit breaker 224 are respectively connected to a storage battery 226. The voltage detection circuit 221 and the current-detection protection system 223 are respectively connected to the storage battery 226. The voltage detection circuit 221 and the circuit breaker 224 are respectively connected to a rectifier and filter circuit 227. The rectifier and filter circuit 227 is connected to a resonant circuit 25. The resonant circuit 25 is connected to a power-receiving coil 251, a carrier amplitude modulation circuit 231 of a signal processing unit 23 and a demodulation detection circuit 2321 of a power-receiving signal analysis circuit 232 of the signal processing unit 23. The demodulation detection circuit 2321 is connected to a comparator circuit 2322 that is connected to the power-receiving microprocessor 21. The power-receiving information management unit 24 is connected to a received power output device 26. The received power output device 26 comprises a transmission interface 261 and an information source 262. The transmission interface 261 and the information source 262 are connected to the power-receiving information management unit 24 that has connected thereto a power-receiving input system 241. The transmission interface 261 is connected to the power-receiving terminal 2611 of the transmission interface 261 and the current-detection protection system 223.

The power supply and data signal transmission method runs subject to the following steps:

(300) The built-in software program of the power supply microprocessor 11 initializes a data encoder and a data decoder and defines a pulse length and then enters a standby mode, and then it proceeds to step (301) after a predetermined time interval;

(301) The built-in software program of the power supply microprocessor 11 automatically converts the frequency and scans resonant frequency f1, modulated frequency f2 and charging frequency f3, and then sends a segment of charging frequency f3 to the power supply driver unit 12, causing the power supply driver unit 12 to drive the power supply coil 181 of the resonant circuit 18 in producing an electromagnetic wave signal;

(302) The power supply signal analysis circuit 13 analyzes the signal from the power supply coil 181 and determines whether or not the signal is a feedback signal from the power-receiving module 2, and then proceeds to step (303) when positive, or returns to step (301) when negative;

(303) The power supply microprocessor 11 continuously sends charging frequency f3 to the power supply driver unit 12, causing it to drive the power supply coil 181 of the resonant circuit 18 in providing an electromagnetic wave signal to the power-receiving module 2;

(304) The power supply microprocessor 11 detects the power supply information management unit 16, determining whether or not there is a data to be transmitted, and then it proceeds to step (306) when positive, or step (305) when negative;

(305) The power supply microprocessor 11 detects whether or not the power supply signal analysis circuit 13 receives a signal, and then it proceeds to step (316) when position, or returns to step (303) when negative;

(306) The power supply microprocessor 11 runs a data transmission program and modulates the signal, and then sends out a start signal;

(307) The power supply microprocessor 11 starts a counter to count the length of the defined start signal;

(308) The power supply microprocessor 11 outputs the modulated start signal;

(309) The power supply microprocessor 11 determines the signal in the register to be "1" or "0", and then runs to step (310) when the signal is "1", or step (312) when the signal is "0";

(310) The power supply microprocessor 11 outputs the modulated signal "1";

(311) The power supply microprocessor 11 starts the counter to count the length of the signal "1", and then demodulates the modulated signal after counting, and then proceeds to step (314);

(312) The power supply microprocessor 11 outputs the modulated signal "0";

(313) The power supply microprocessor 11 starts the counter to count the length of the signal "0", and then demodulates the modulated signal after counting;

(314) The power supply microprocessor 11 determines whether or not transmission of all the bits in the register has been done, and then turns off the data transmission program and proceeds to step (330) when positive, or proceeds to step (315) when negative;

(315) Send the next bit of the transmitting data in the register to the power supply microprocessor 11, and then returns to step (309);

(316) The power supply microprocessor 11 executes data decode program, detecting modulation of the signal;

(317) The power supply microprocessor 11 counts the pulse length of the received modulated signal;

(318) The power supply microprocessor 11 judges whether or not the start signal had been received, and then proceeds to step (319) when positive, or step (322) when negative;

(319) The power supply microprocessor 11 judges whether or not the pulse length is within the range of the start signal, and then proceeds to step (320) when positive, or step (321) when negative;

(320) The start signal is recognized, and the power supply microprocessor 11 starts to store the received bits, and then returns to step (316);

(321) The start signal fails, the power supply microprocessor 11 ends the software program directly, and then proceeds to step (330);

(322) The power supply microprocessor 11 judges whether or not the pulse length is within the range of the logic [1] signal, and then proceeds to step (323) when positive, or step (324) when negative;

(323) The power supply microprocessor 11 judges the bit of logic [1] has been received and then stores the bit in the internal data register, and then proceeds to step (327);

(324) The power supply microprocessor 11 judges whether or not the pulse length is within the range of the logic [0] signal, and then proceeds to step (326) when positive, or step (325) when negative;

(325) Noises are in presence, and the power supply microprocessor 11 clears the incomplete bit data, and then proceeds to step (330);

(326) The power supply microprocessor 11 judges the bit of logic [0] has been received and then stores the bit in the internal data register;

(327) The data register stores the received data.

(328) The power supply microprocessor 11 judges whether or not receipt of the assigned bits has been done, and then proceeds to step (329) when positive, or returns to step (316) when negative;

(329) The power supply microprocessor 11 outputs the data to the external electronic apparatus;

(330) The power supply microprocessor 11 recognizes the content of the data, and then sends the data to the power supply information management unit 16 or the display unit 15 subject to the request of the software program;

(331) The power supply microprocessor 11 utilizes a power supply control program to monitor charging status, and returns to step (301) when the power-receiving module 2 is beyond the induction range.

In the aforesaid power supply module 1, the power circuit 17 can receive power from the external power source 171 that can be city power supply, or the power supply of an external electronic apparatus. The external electronic apparatus can be a power supply component of a computer, power supply device or storage battery. Further, the two MOSFET arrays 122;123 of the power supply driver unit 12 are adapted to switch between a full-bridge frequency and a half-bridge frequency. During the power supply mode, the two MOSFET arrays 122;123 drive the power supply coil 181 to oscillate, thereby emitting electrical energy. Further, the power supply microprocessor 11 automatically converts the frequency and scans resonant frequency f1, modulated frequency f2 and charging frequency f3 of the power supply coil 181 of the resonant circuit 18 within a predetermined length of time. The predetermined length of time can be 1 second, 2 seconds, or a relatively longer time. Within this predetermined length of time, no frequency is to be sent out, and only a length of $\frac{1}{100}$ seconds of charging frequency f3 is sent out to detect whether or not the power-receiving module 2 is within the induction range. Thus, the operating time of the power supply module 1 is minimized, saving the energy.

As stated above, the power supply signal analysis circuit 13 consists of the comparator circuit 131 and the demodulation detection circuit 132. The data signal received by the power supply coil 181 is sent to the comparator circuit 131 for analog/digital conversion, enabling the converted digital signal to be transmitted to the power supply microprocessor 11 so that the power supply microprocessor 11 can display the data on the display unit 15. The power supply input interface 161 of the power supply information management unit 16 can be any data input device, such as keyboard, mouse, remote controller or cursor control device. Further, the transmission interface 162 of the power supply information management unit 16 can be a USB interface, eSATA interface or HDMI interface for data signal transmission.

Further, the transmission interface 261 of the received power output device 26 can be a USB interface, eSATA interface or HDMI interface for data signal transmission. The information source 262 of the received power output device 26 can be a computer or PDA that is capable of making, editing, setting and processing data signal.

Further, the power-receiving terminal 2611 of the transmission interface 261 of the received power output device 26 is adapted to charge the battery of an external electronic apparatus wirelessly. The external electronic apparatus can be a mobile telephone, MP3, MP4, MP5, digital camera, electronic watch, portable game machine, wireless game grip or remote controller that is to be charged and that can edit, process and transmit data signal.

Referring to FIGS. 8, 9A, 9B and 9C and FIGS. 1-3 again, the power supply module 1 switches the MOSFET arrays 122;123 between the half-bridge mode and the full-bridge mode via the half-/full-bridge driver 121 of the power supply driver unit 12. When switched to the half-bridge mode, it is the normal operation status. When switched to the full-bridge mode, the amplitude is multiplied, and the signal is modulated. When adjusted to the original frequency or switched back to the half-bridge mode, it is returned to the original amplitude. Through the power supply coil 181 of the resonant circuit 18, the modulated signal is transmitted to the power-receiving coil 251 of the power-receiving module 2. Further, increasing the amplitude of the modulation relatively increases the amplitude of the signal received by the power-receiving coil 251. On the contrary, reducing the amplitude of the modulation relatively reduces the amplitude of the signal received by the power-receiving coil 251.

Further, the carrier amplitude modulation circuit 231 of the signal processing unit 23 that is connected to one end of the power-receiving coil 251 comprises an inductor 2311, a diode 2312 and a switch 2313. The switch 2313 is a MOSFET device for data signal modulation control. When switching the switch 2313 to the close-circuit position, the inductor 2311 will cause floating of the resonant characteristic of the power-receiving coil 251. Thus, a dynamic modulation is produced within a short time subject to lowering of the signal at the ends of the power-receiving coil 251. The signal will be fed back to the power supply coil 181 of the power supply module 1. This is to say that when the resonant characteristic of the power-receiving coil 251 is floating the power supply coil 181 of the power supply module 1 loses its resonance reaction temporarily, resulting in increased amplitude. The power supply coil 181 and the power-receiving coil 251 will resume to the status before signal modulation for transmission of electrical energy only after modulation of the data signal.

The aforesaid signal modulation can be achieved by means of full-/half-bridge switching, frequency conversion or the application of an inductor to cause floating of coil resonance characteristic. The power supply module 1 and the power-receiving module 2 can modulate data signal by means of one of the aforesaid three techniques. Preferably, the power supply module 1 uses the technique of full-/half-bridge switching or frequency conversion to modulate data signal; the power-receiving module 2 uses the inductor 2311 to cause floating of the resonant characteristic of the power-receiving coil 251. These techniques are simply for increasing the signal amplitude for data transmission, but not intended for use as limitations.

After change of the amplitude of the power supply coil 181 or power-receiving coil 251, the data signal is converted into a data code by the demodulation detection circuit 132 or 2321 and a decode software. The demodulation detection circuit 132 or 2321 consists of a plurality of capacitors, resistors and filters. The data signal obtained through the demodulation detection circuit 132 or 2321 is an analog signal that must be converted into a digital signal by the comparator circuit 131 or 2322. This digital signal is then transmitted to the power supply microprocessor 11 or power-receiving microprocessor 21 for analysis by the decoder software built therein. Because the pulse width of the signal will bias after transmission wirelessly, it is necessary to correct the bias by means of a decoder software setting, converting the bias into accurate digital signal logic "0" or logic "1", or judging the signal to be an unreadable noise.

Figure 9A:
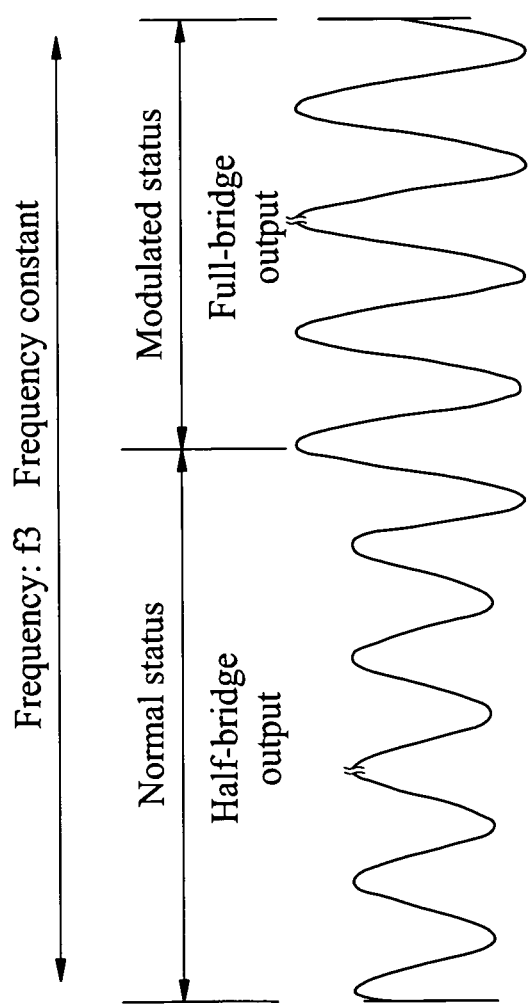
FIG. 9A is a schematic drawing showing switching of signal modulation between full-bridge and half-bridge according to the present invention.
Figure 9B:
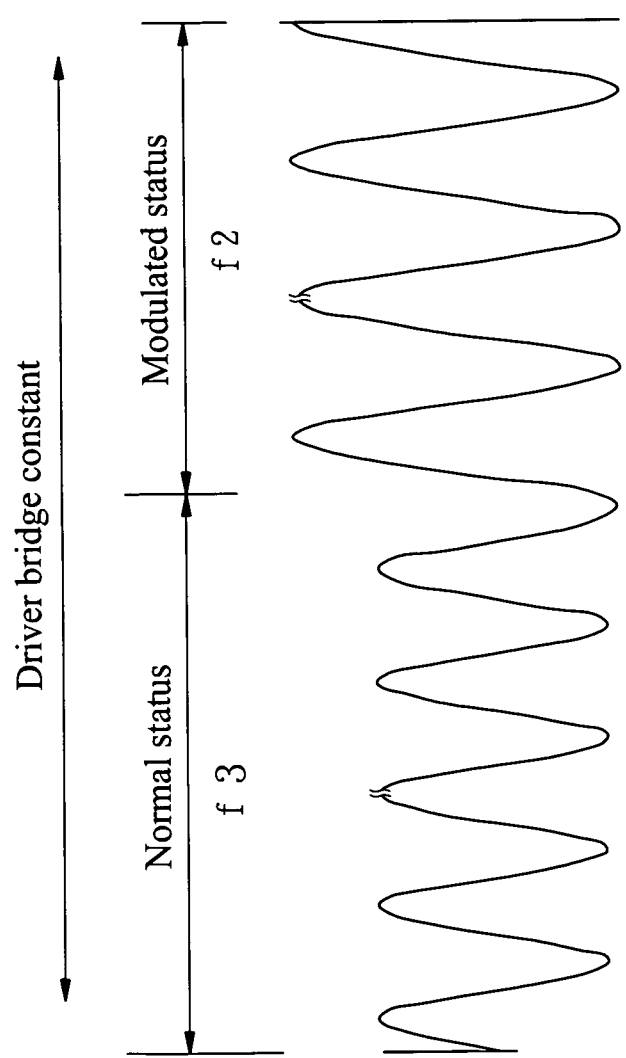
FIG. 9B is a schematic drawing showing frequency conversion of signal modulation according to the present invention.
Figure 9C:
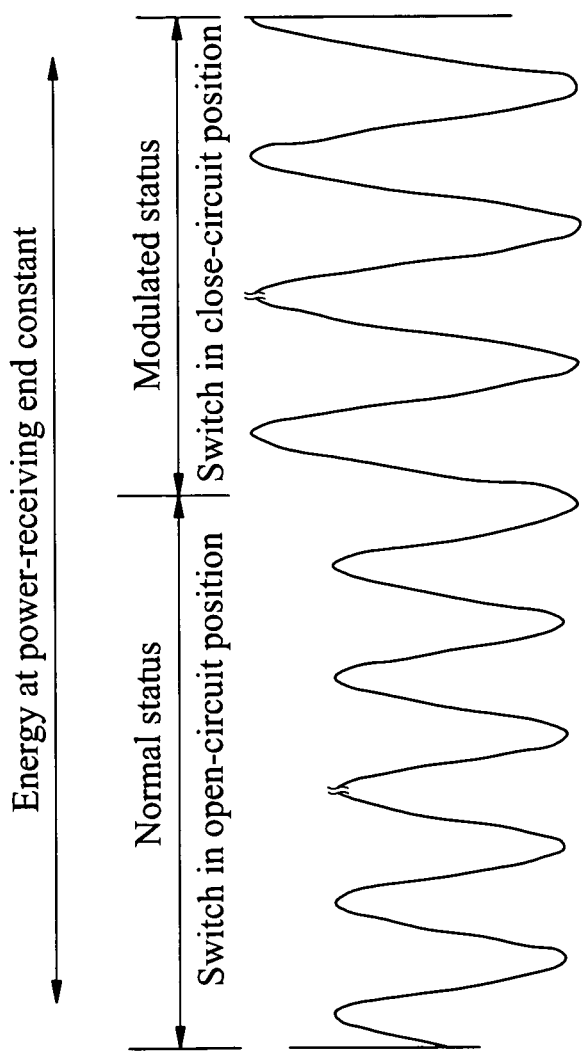
FIG. 9C is a schematic drawing showing resonance feedback during signal modulation according to the present invention.
Figure 9D:
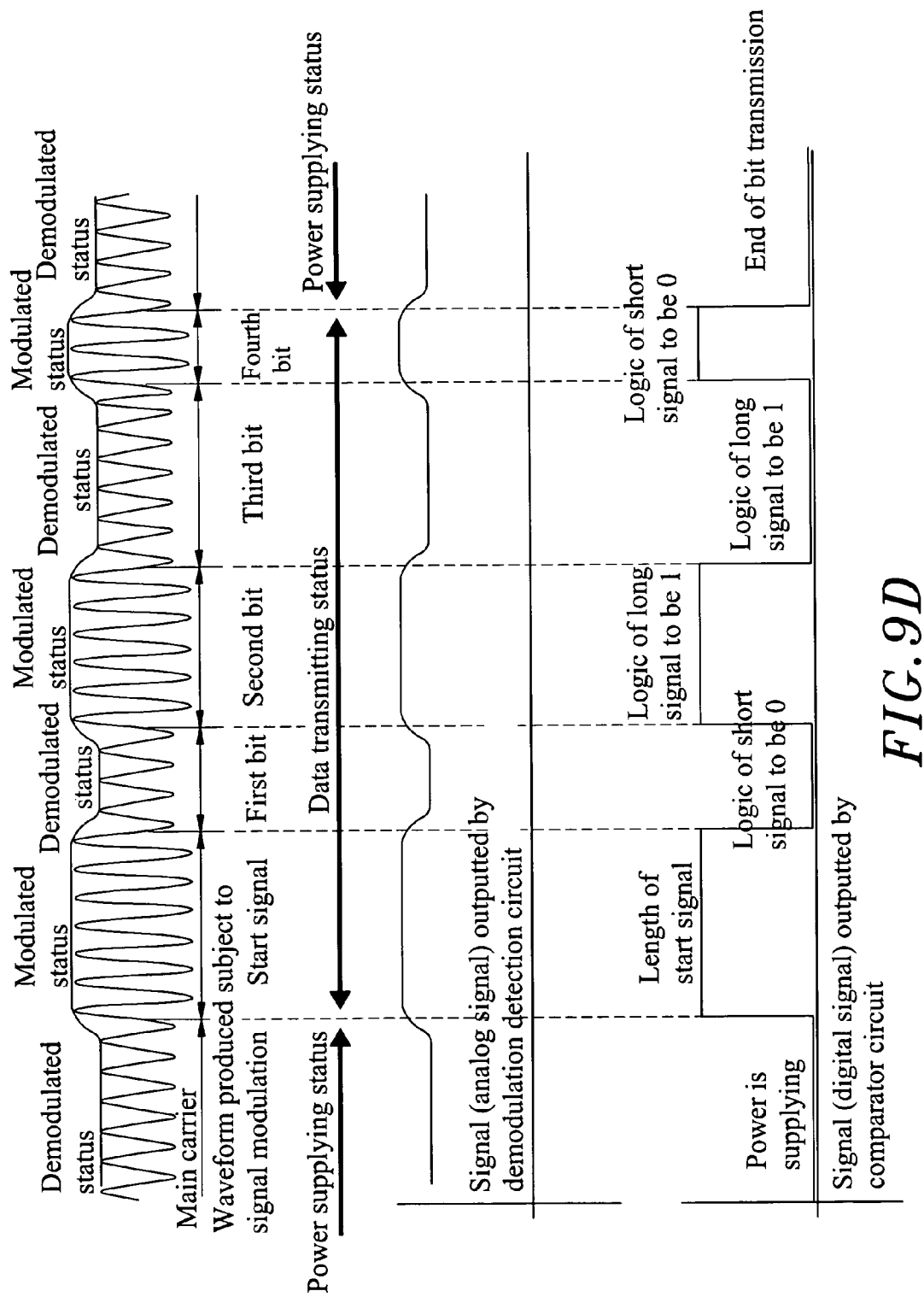
FIG. 9D is a schematic drawing showing a data signal decoding process according to the present invention.

Referring to FIG. 9D and FIGS. 1-3 again, if the level of the signal is higher than the reference voltage of the comparator during operation of the power supply module 1 or power-receiving module 2, the signal is judged to be a modulated signal (HI); if the level of the signal is lower than the reference voltage of the comparator during operation of the power supply module 1 or power-receiving module 2, the signal is judged to be an unmodulated signal (LOW). When no data is in transmission, the demodulation detection circuit 132 or 2321 is kept on the status of LOW. On the contrary, when a data signal is modulated, the demodulation detection circuit 132 or 2321 scans the level of the signal to be higher than the reference voltage of the comparator, i.e., on the status of HI. At this time, the signal is transmitted to the power supply microprocessor 11 or power-receiving microprocessor 21 for decoding by the respective decoder software.

By means of the aforesaid data transmission operation between the power supply module 1 and the power-receiving module 2, data signal for setting, editing or processing control can be transmitted between the power supply module 1 and the power-receiving module 2 as the power-receiving module 2 charges the battery of an external electronic device.

As stated above, the invention provides a power supplying and data transmitting method for induction type power supply system, which enables a power supply microprocessor 11 of a power supply module 1 to receive electrical energy from a power circuit 17 or data signal from a power supply information management unit 16 and to send the electrical energy or data signal to a power supply driver unit 12 for transmission to a power-receiving coil 251 of a resonant circuit 25 of a power-receiving module 2 through a power supply coil 181 of a resonant circuit 18. Upon receipt of the electrical energy/data signal from the power supply coil 181, the resonant circuit 25 of a power-receiving module 2 transmits the electrical power/data signal to a power-receiving microprocessor 21 through a power-receiving unit 22 and a signal processing unit 23, enabling the electrical energy/data signal to be transmitted to an external electronic apparatus through a received power output device 26. By means of a power supply input interface 161 of the power supply information management unit 16, setting, editing and data signal processing and transmission command signals are inputted into the power supply module 1 for transmission to the power-receiving coil 251 of the power-receiving module 2, enabling the power-receiving module 2 to control setting, operation or editing of the external electronic apparatus. Thus, the invention achieves battery charging and data transmission in a wireless manner.

In conclusion, the invention provides a power supplying and data transmitting method for induction type power supply system, which has the following advantages and features:

1. By means of the power supply information management unit 16 of a power supply module 1, input data signal is transmitted to the power supply microprocessor 11 for transmission to the power-receiving coil 251 of the resonant circuit 25 of the power-receiving module 2 through the power supply coil 181 of the resonant circuit 18 subject to the driving control of the power supply driver unit 12, avoiding signal power loss or dynamic range limiting of the modulation, and assuring data signal transmission stability.

2. During transmission of electrical energy/data signal between the power supply module 1 and the power-receiving module 2, sudden surge is prohibited, avoiding component damage.

3. During transmission of electrical energy between the power supply module 1 and the power-receiving module 2, data signal transmission can be simultaneously and rapidly performed without causing interference or the use of a high carrier frequency.

4. Transmission of electrical energy and data signal between the power supply module 1 and the power-receiving module 2 is performed through the power supply coil 181 of the resonant circuit 18 and the power-receiving coil 251 of the resonant circuit 25, assuring high reliability.

A prototype of power supplying and data transmitting method for induction type power supply system has been constructed with the features of FIGS. 1-9D. The power supplying and data transmitting method for use in an induction type power supply system works smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A power supply and data signal transmission method used in an induction type power supply system comprising a power supply module and a power-receiving module for transmission of electrical energy and data signal between said power supply module and said power-receiving module, said power supply module comprising a power supply microprocessor, a signal processing unit, a power supply information management unit, a display unit, a power supply driver unit, a power supply signal analysis circuit and a resonant circuit having a power supply coil, said power-receiving module comprising a power-receiving microprocessor, a power-receiving unit, a signal processing unit, a power-receiving information management unit and a resonant circuit having a power-receiving coil, the power supply and data signal transmission method comprising the steps of:

(A01) a built-in software program of said power supply microprocessor initializes a data encoder and a data decoder and defines a pulse length and then enters a standby mode, and then proceeds to step (A02) after a predetermined time interval;

(A02) the built-in software program of said power supply microprocessor automatically converts a frequency of the data signal by scanning a resonant frequency, a modulated frequency and a charging frequency, and then sends a segment of the charging frequency to said power supply driver unit, causing said power supply driver unit to drive said power supply coil of said resonant circuit in producing an electromagnetic wave signal;

(A03) said power supply signal analysis circuit analyzes the signal from said power supply coil and determines whether or not the signal is a feedback signal from said power-receiving module, and then proceeds to step (A04) when positive, or returns to step (A02) when negative;

(A04) said power supply microprocessor continuously sends the charging frequency to said power supply driver unit, causing said power supply driver unit to drive said power supply coil of said resonant circuit in providing an electromagnetic wave signal to said power-receiving module;

(A05) said power supply microprocessor detects said power supply information management unit, determining whether or not a data is produced and to be transmitted, and then proceeds to step (A07) when positive, or step (A06) when negative;

(A06) said power supply microprocessor detects whether or not said power supply signal analysis circuit receives a signal, and then proceeds to step (A08) when positive, or returns to step (A04) when negative;

(A07) said power supply microprocessor runs a data transmission program and modulates the signal, and then proceeds to step (A09) after data transmission;

(A08) said power supply microprocessor runs a data decode program and then proceeds to step (A09) after receipt of data;

(A09) said power supply microprocessor recognizes the content of the data received and judges a request of the built-in software program and then sends the data to said power supply information management unit or said display unit subject to the request of the built-in software program; and (A10) said power supply microprocessor monitors charging status by means of a power supply control program and then returns to step (A02) when said power-receiving module is out of the induction range.

2. The power supply and data signal transmission method as claimed in claim 1, wherein said power supply microprocessor runs said data transmission program subject to the steps of:

(B01) said power supply microprocessor runs said data transmission program and modules the signal and then sends out a start signal;

(B02) said power supply microprocessor starts a counter to count the length of the defined start signal;

(B03) said power supply microprocessor outputs the modulated start signal;

(B04) said power supply microprocessor determines the signal in the register thereof to be "1" or "0", and then proceeds to step (B05) when the signal is "1", or step (B07) when the signal is "0";

(B05) said power supply microprocessor outputs the modulated signal "1";

(B06) said power supply microprocessor starts the counter to count the length of the signal "1", and then demodulates the modulated signal after counting, and then proceeds to step (B09);

(B07) said power supply microprocessor outputs the modulated signal "0";

(B08) said power supply microprocessor starts said counter to count the length of the signal "0", and then demodulates the modulated signal after counting;

(B09) said power supply microprocessor determines whether or not transmission of all the bits in the register has been done, and then turns off said data transmission program and proceeds to step (A09) when positive, or proceeds to step (B10) when negative;

(B10) send the next bit of the transmitting data in said register to said power supply microprocessor, and then returns to step (B04).

3. The power supply and data signal transmission method as claimed in claim 1, wherein said power supply microprocessor runs said data decode program subject to the steps of:

(C01) said power supply microprocessor executes said data decode program, detecting modulation of the signal;

(C02) said power supply microprocessor counts the pulse length of the received modulated signal;

(C03) said power supply microprocessor judges whether or not the start signal had been received, and then proceeds to step (C04) when positive, or step (C07) when negative;

(C04) said power supply microprocessor judges whether or not the pulse length is within the range of the start signal, and then proceeds to step (C05) when positive, or step (C06) when negative;

(C05) said start signal is recognized, and said power supply microprocessor starts to store the received bits, and then returns to step (C01);

(C06) said start signal fails, said power supply microprocessor ends the software program directly, and then proceeds to step (A09);

(C07) said power supply microprocessor judges whether or not the pulse length is within the range of the logic [1] signal, and then proceeds to step (C08) when positive, or step (C09) when negative;

(C08) said power supply microprocessor judges the bit of the logic [1] has been received and then stores the bit in the internal data register, and then proceeds to step (C12);

(C09) said power supply microprocessor judges whether or not the pulse length is within the range of the logic [0] signal, and then proceeds to step (C11) when positive, or step (C10) when negative;

(C10) the signal is determined to be a noise, and then said power supply microprocessor clears the incomplete bit data, and then proceeds to step (A09);

(C11) said power supply microprocessor judges the bit of logic [0] has been received and then stores the bit in the internal data register;

(C12) the dada register stores the received data;

(C13) said power supply microprocessor judges whether or not receipt of the assigned bits has been done, and then proceeds to step (C14) when positive, or returns to step (C01) when negative; and (C14) said power supply microprocessor outputs the data to an external electronic apparatus, and then proceeds to step (A09).

4. The power supply and data signal transmission method as claimed in claim 1, wherein said power supply driver unit of said power supply module comprises a half-/full-bridge driver electrically connected to said power supply microprocessor and two MOSFET arrays that are respectively connected to said resonant circuit, said half-/full-bridge driver of said power supply driver unit and said two MOSFET arrays being respectively connected to said power circuit, said two MOSFET arrays being adapted to switch between a full-bridge frequency and a half-bridge frequency such that when in a power supply mode, said two MOSFET arrays drive said power supply coil to oscillate and to further emit electrical energy, said two MOSFET arrays being capable of modulating a signal to enhance the amplitude of the signal for data transmission.

5. The power supply and data signal transmission method as claimed in claim 1, wherein said power supply driver unit of said power supply module changes the output frequency thereof to modulate signal, enhancing the amplitude of the signal for data transmission.

6. The power supply and data signal transmission method as claimed in claim 1, wherein said power supply signal analysis circuit comprises a demodulation detection circuit adapted to demodulate the received signal, and a comparator circuit adapted to convert the demodulated analog signal into a digital signal.

7. The power supply and data signal transmission method as claimed in claim 1, wherein said signal processing unit of said power-receiving module comprises a demodulation detection circuit adapted to demodulate the received signal, and a comparator circuit adapted to convert the demodulated analog signal into a digital signal.

8. The power supply and data signal transmission method as claimed in claim 1, wherein said signal processing unit comprises a carrier amplitude modulation circuit, said carrier amplitude modulation circuit comprising an inductor, a diode and a switch, said switch being switchable to a close-circuit position where said inductor causes floating of the resonant characteristic of said power-receiving coil so that a dynamic modulation is produced within a short time subject to lowering of the signal at the ends of said power-receiving coil and the signal is fed back to said power supply coil of said power supply module.

* * * * *